Nov. 29, 1949     W. E. MONTAGUE     2,489,535
FLEXIBLE CLAMP
Filed Aug. 27, 1948     2 Sheets-Sheet 1
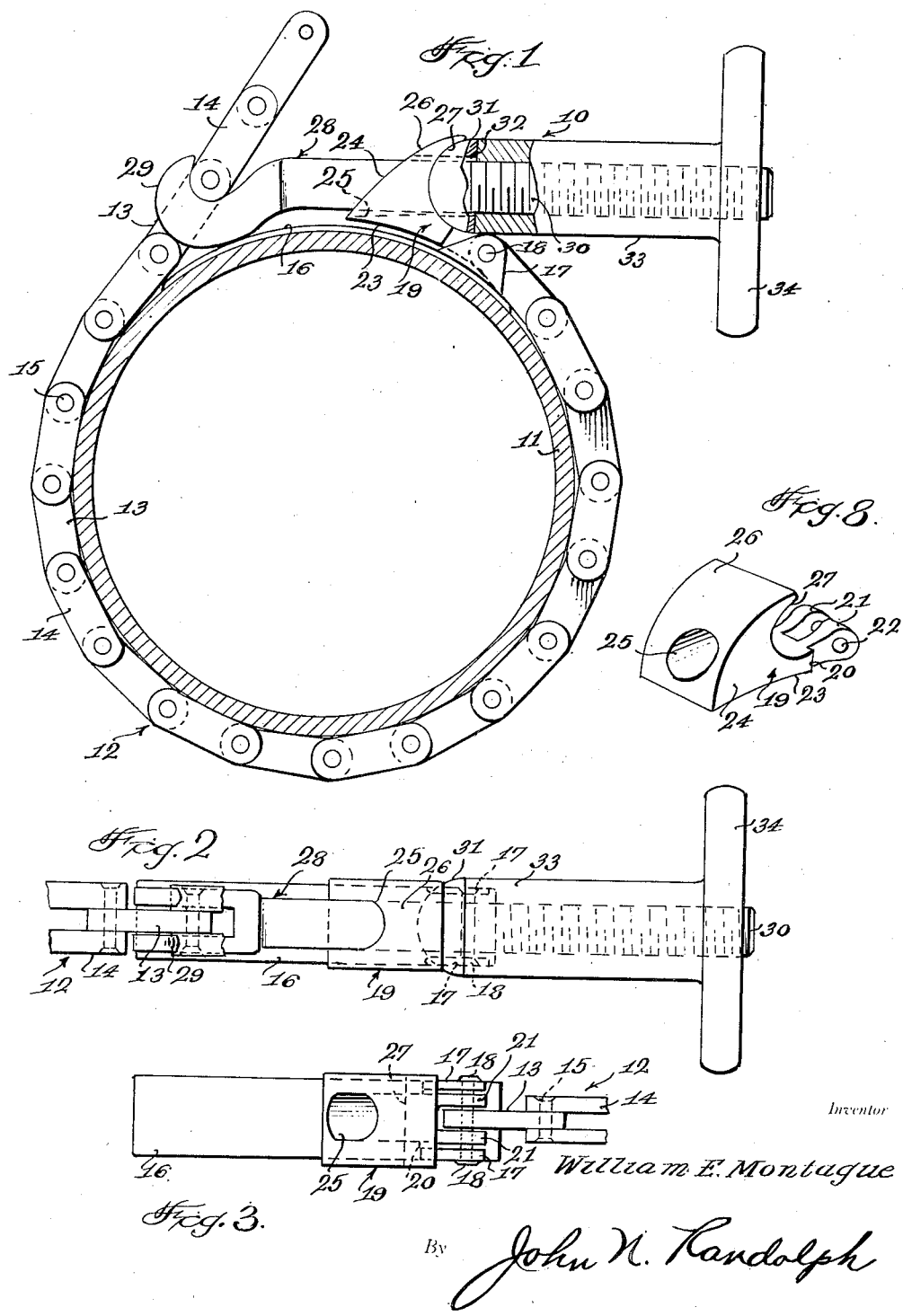
Inventor
William E. Montague
By John N. Randolph
Attorney

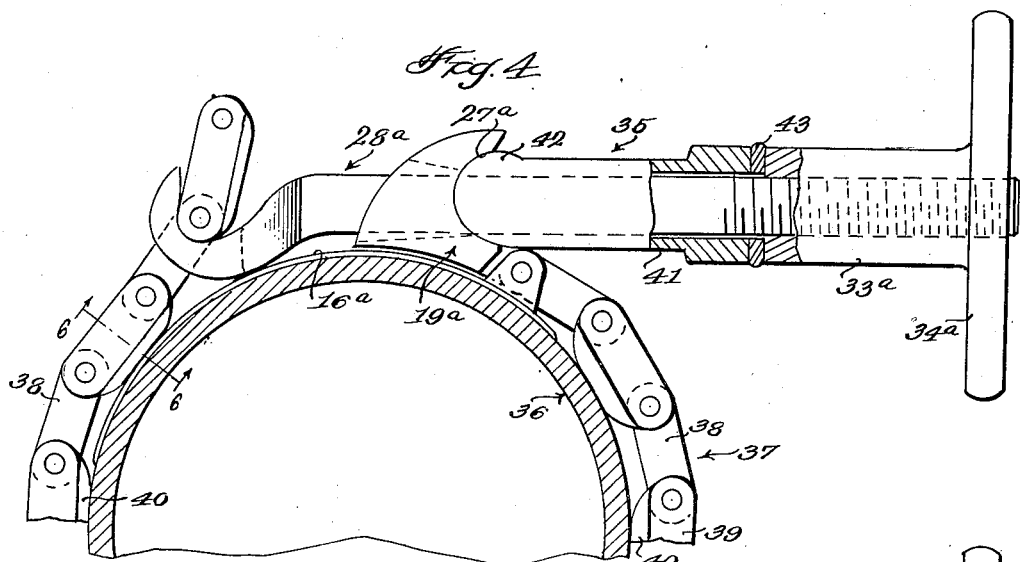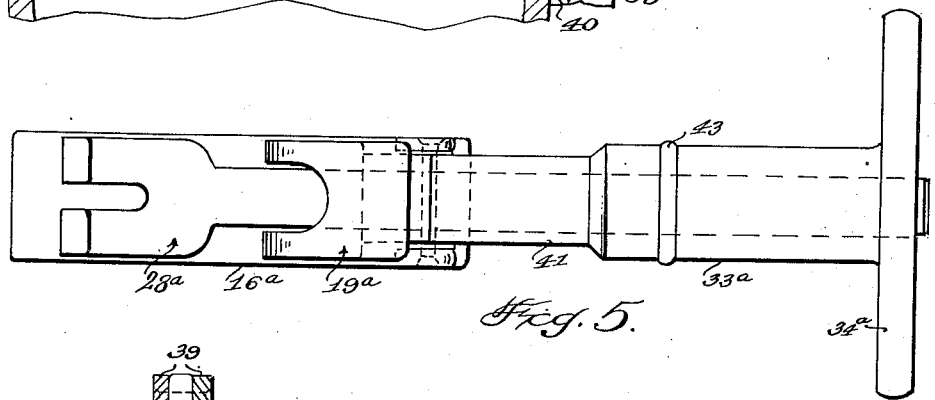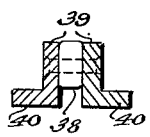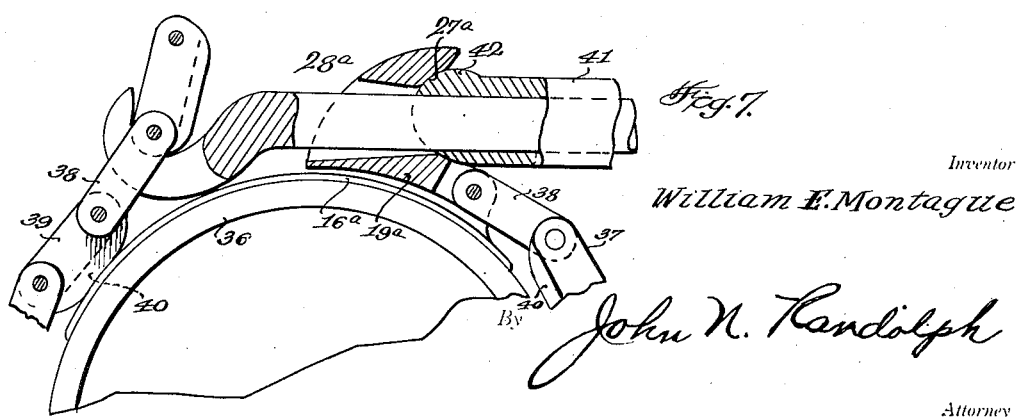

Patented Nov. 29, 1949

2,489,535

UNITED STATES PATENT OFFICE 2,489,535

FLEXIBLE CLAMP

William E. Montague, Inglewood, Calif.

Application August 27, 1948, Serial No. 46,437

7 Claims. (Cl. 24—19)

This invention relates to a novel construction of flexible clamp for clamping elements of different sizes and which is equally well adapted for clamping solid or laminated elements.

Another object of the invention is to provide a clamp capable of being applied to elements having a hard or soft surface and which will not damage the surface of the elements formed of soft material.

Various other objects and advantages of the invention will hereinafter become more fully apparent from the following description of the drawings, illustrating preferred embodiments thereof, and wherein:

Figure 1 is a side elevational view, partly in section illustrating one form of the clamp in an applied position;

Figure 2 is a fragmentary top plan view thereof;

Figure 3 is a fragmentary plan view of one end of the clamp with certain of the parts removed therefrom;

Figure 4 is a fragmentary side elevational view, partly in section of a slightly modified form of the clamp;

Figure 5 is a fragmentary plan view of a portion of the clamp of Figure 4;

Figure 6 is a cross sectional view through the clamping chain taken substantially along a plane as indicated by the line 6—6 of Figure 4;

Figure 7 is a fragmentary side elevational view, partly in section illustrating details of the clamp of Figures 4, 5 and 6, and Figure 8 is a perspective view of one element of the clamp common to both forms of the invention.

Referring more specifically to the drawings, and first with reference to the embodiment of the invention as illustrated in Figures 1 to 3 and 8, the flexible clamp comprising the invention is designated generally 10 and is primarily adapted for clamping an object or element 11 of circular cross section which may be either hollow or solid and of either integral or laminated construction.

The flexible clamp 10 includes a chain, designated generally 12 formed of alternate single and double links 13 and 14, respectively, which are pivotally connected in a conventional manner by rivets 15 and with the ends of each of the double links straddling ends of the single links.

A leaf spring or elongated flexible strip 16 is provided and adjacent one end thereof with upstanding ears 17 which rise from adjacent the side edges of the strip 16 and which are provided with aligned apertures for receiving a pin 18 having headed ends disposed on the outer sides of the ears 17. One end of the chain 12 is formed by a single link 13 the free end of which pivotally engages the pin 18 between the ears 17.

A rocker shoe, designated generally 19 and best illustrated in Figure 8, is provided with a shank portion 20 which is recessed on both sides thereof to be of a width less than the remainder of said rocker shoe 19 and is bifurcated to form a pair of corresponding lugs or furcations 21 which are adapted to fit between the ears 17 and to straddle the end of the link 13 which is pivotally mounted on the pin 18 and said lugs 21 are provided with aligned apertures 22 to loosely engage the pin 18 for pivotally connecting the rocker shoe 19 to one end of the chain 12 and to the flexible guard strip 16. The rocker shoe 19 is provided with a concave underside 23 which conforms substantially to the curvature of the guard strip 16 when the latter is in engagement with a portion of the exterior surface of the object or element 11. The rocker shoe 19 at its opposite end is provided with an upwardly and inwardly curved tapered portion 24 having an opening 25 extending outwardly and in a direction downwardly therethrough and longitudinally of the rocker shoe 19. The outer surface 26 of the portion 24 is curved upwardly and rearwardly and is externally convex while the opposite, rear or inner side 27 is concave, as seen in Figure 1.

A hook, designated generally 28 is provided with a bifurcated claw or hook terminal 29 the furcations of which are adapted to straddle one of the single links 13 and the inner sides of which are adapted to engage the end of one of the double links 14 for detachably connecting the hook 28 to the chain 12 at a point thereof remote to the end connected to the rocker shoe 19. As seen in Figure 1, a link of the chain disposed adjacent the single link engaged by the hook 28 normally contacts the free end of the guard strip 16 and the outer side of a portion of the hook 28 also bears upon a portion of said guard strip 16 so as to prevent said hook portion from being embedded in the surface of the element 11 and to prevent said element from buckling between the end portions of the chain, particularly when the element or object 11 is of a laminated construction. The hook 28 also includes an elongated shank 29 which extends loosely through the opening 25 of the rocker shoe and which is provided therebeyond with a threaded terminal portion 30.

A substantially hemispherical rocker 31 has its convex surface seated substantially flush against the rocker shoe surface 27 and is provided with an opening 32 through which a portion of the hook shank 29 loosely extends. An elongated threaded sleeve 33 threadedly engages the shank portion 30 and has an inner end which abuts against the flat side of the rocker 31. The opposite, outer end of the sleeve 33 is provided with an enlargement forming a hand wheel 34 adapted to be manually engaged for turning the sleeve 33 for drawing the shank 29 through the rocker shoe and rocker in a direction from left to right of Figure 1 for drawing the ends of the chain 12 into clamping engagement around the object 11. It will be obvious that a limited rocking motion of the hook shank 29 will occur relatively to the rocker shoe 19 as the clamp 10 is tightened and said rocking motion will be accommodated by the sliding bearing engagement of the rocker 31 with the surface 27 of the rocker shoe 19. The clamp 10, previously described, is primarily adapted for clamping objects or elements 11 of relatively hard material.

For clamping objects or elements of softer materials of either integral or laminated construction, a modified form of the clamp as illustrated in Figures 4 to 8 is preferably employed and which is designated generally 35 and shown applied to an object or element 36. The clamp 35 includes a guard strip 16a, corresponding to the guard strip 16, a rocker shoe 19a, corresponding to the rocker shoe 19, a hook 28a, corresponding to the hook 28 and a tightening sleeve 33a, corresponding to the sleeve 33 and which is provided with a hand wheel 34a.

The flexible part or chain 37 of the clamp 35 differs from the chain 12 in that the double links 39 thereof extend inwardly beyond the single links 38 by the provision of the outturned flange portions 40, as best illustrated in Figure 6, which are provided with rounded ends as seen in Figure 4 and which are of a width to prevent said chain links 39 from becoming embedded in the exterior surface of the object or element 36 when said element is formed of a relatively soft material such as soft metal, plastic or wood. The flanges or foot portions 40 of the links 39 also function to retain the links 38 completely out of contact with the element 36, as clearly illustrated in Figure 4.

In lieu of the rocker member 31, the clamp 35 is provided with a second inner sleeve 41 having an unthreaded bore to loosely receive a portion of the shank of the hook 28a and has an externally rounded inner end 42 corresponding in shape to the convex side of the rocker 31 which is adapted to seat substantially flush for limited rocking movement in the concave surface 27a of the rocker shoe 19a and for the same purpose as the rocker 31. Between the opposite, flat end of the sleeve 41 and the adjacent inner end of the sleeve 33a, a thrust bushing of bronze is interposed as seen at 43 to permit the sleeve 33a to be turned readily relatively to the member 41 with a minimum of frictional resistance for tightening the clamp 35.

Various modifications and changes are contemplated and may obviously be resorted to, without departing from the spirit or scope of the invention as hereinafter defined by the appended claims.

I claim as my invention:

1. A flexible clamp comprising a chain formed of alternate single and double links, a flexible guard strip forming an extension of one end of said chain and pivotally connected to an end link thereof, a rocker shoe pivotally supported on said pivot and normally disposed over a portion of the guard strip, a hook detachably and selectively engaging said chain remote to the aforementioned end thereof and having an elongated shank, said rocker shoe having a longitudinally disposed opening through which said hook shank loosely extends, said rocker shoe having a concave rocker surface, a rocker element having a substantially hemispherical surface for rocking engagement with the concave surface of the rocker shoe and provided with an opening through which the hook shank loosely extends, said hook shank having a threaded terminal portion, and an elongated internally threaded sleeve for engaging the threaded hook shank and having a hand wheel at its outer end for turning said sleeve, the inner end of said sleeve bearing against a substantially flat portion of said rocker.

2. A clamp as in claim 1, said hook having a bifurcated claw for straddling a single link of the chain and having a concave inner side for engaging an end of a double link of the chain.

3. A clamp as in claim 1, said guard strip being disposed beneath a portion of the hook for holding the hook out of contact with an element or object being clamped.

4. A clamp as in claim 1, the inner edges of said double links having outturned flanges for engagement with the surface of an object being clamped and which extend inwardly beyond the inner edges of the single links for holding said single links out of contact with the object.

5. A clamp as in claim 1, said rocker having an elongated sleeve portion extending from the hemispherical part thereof.

6. A clamp as in claim 1, said rocker having an elongated sleeve portion extending from the hemispherical part thereof, and a bronze antifriction bushing interposed between said sleeve portion of the rocker and the adjacent end of the threaded sleeve.

7. A clamp as in claim 1, said guard strip having a free end portion disposed beneath a portion of the chain located adjacent the link engaged by the hook.

WILLIAM E. MONTAGUE.

No references cited.